Nov. 3, 1925. 1,560,274

W. C. McLAM ET AL

THROTTLE CONTROL

Filed June 19, 1925

Inventor
Walter C. McLam
Herbert Eshelmon

By Herbert E. Smith

Attorney

Patented Nov. 3, 1925.

1,560,274

UNITED STATES PATENT OFFICE.

WALTER C. McLAM AND HERBERT ESHELMAN, OF SPOKANE, WASHINGTON.

THROTTLE CONTROL.

Application filed June 19, 1925. Serial No. 38,238.

*To all whom it may concern:*

Be it known that we, WALTER C. McLAM and HERBERT ESHELMAN, citizens of the United States, residing at Spokane, in Spokane County and State of Washington, have invented certain new and useful Improvements in Throttle Controls, of which the following is a specification.

Our present invention relates to improvements in throttle controls especially of the pedal or foot operated type, for the purpose of controlling the supply of gasoline to the motors of automotive vehicles. The device of our invention is applicable for use with the stem of the foot operated depressible button known as the accelerator, which is movable through the foot board of the automobile for actuating the throttle or valve of the gas supply of the engine or motor.

By the utilization of the control device of our invention, the normally elevated depressible stem is capable of being retained in a predetermined partially lowered or depressed position to insure a uniform and continuous feed of gas to the engine for a normal speed of the automobile. Means are provided whereby the throttle control is released from this predetermined position when desired, and means are also provided whereby the depressible operating stem of the throttle device may be actuated independently of the throttle control device of our invention. The invention involves the use of a detent and pawl connection which are adapted to throttle down the intake of gas to the supply under which the automobile will run at a light load. The invention consists in certain novel combinations and arrangements of parts as will hereinafter be more fully set forth and claimed.

In the accompanying drawings we have illustrated one complete example of the physical embodiment of our invention wherein the parts are combined and arranged according to the best mode we have so far devised for the practical application of the principles of our invention.

Figure 1:
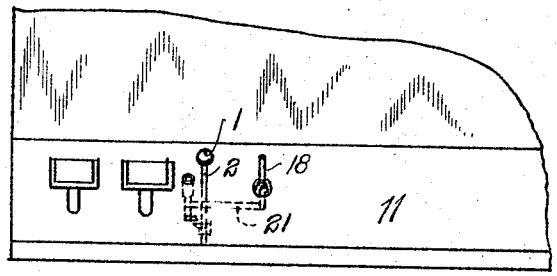
Figure 1 is a view showing a portion of the foot board of an automotive vehicle equipped with the device of our invention.
Figure 2:
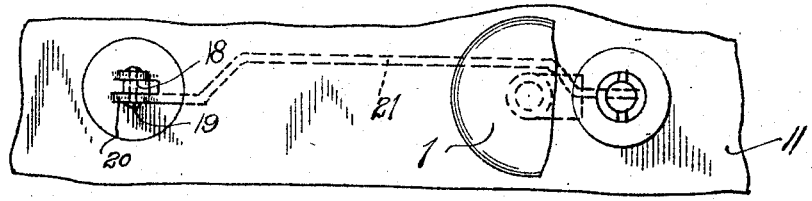
Figure 2 is an enlarged top plan view showing the general arrangement of parts.

Our device is capable of use in the equipment of the car or automobile at the factory, or existing accelerators now in use employing a depressible lever for actuating the throttle, may be converted for use with the device without materially altering the foot actuated device. When thus equipped the usual foot operated or depressible button 1 and its stem 2 are provided with a sleeve 3 that may be adjusted to desired position on the stem. This sleeve which is fashioned with a laterally extending preferably integral pawl 4, may be rigidly affixed in desired position on the stem by means of a set screw 5.

Figure 3:
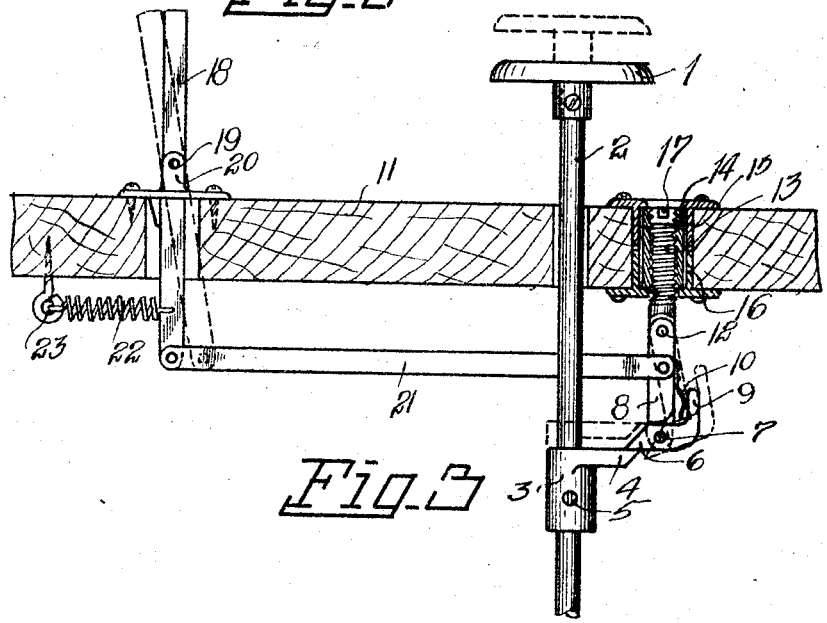
Figure 3 is a vertical sectional view transversely of the automobile through the foot board, showing the device in elevation and partly in section.

The pawl is located beneath the foot-board 11, and in connection with the pawl we utilize a detent or latch 6 which is located in the path of movement of the pawl and pivoted at 7 on a link 8 in order that the detent may swing down from the horizontal position, but not upwardly, as indicated in Figure 3. By means of the angular lug 9 on the detent, and a spring 10 interposed between the lug and the link, the detent is normally retained in position in the path of movement of the pawl on the stem.

The link 8 is suspended in normally vertical position below the foot board through which the stem passes, by means of a pivot pin 12 which secures the link at the lower end of a screw or bolt 13. This screw or bolt is supported in a non-traveling nut or interiorly threaded sleeve 14 which is adapted to turn and is confined in the foot board within an upper flanged collar 15 attached at the top of the foot board and the complementary flanged collar 16 attached at the under side of the foot board.

These flanged collars are assembled by insertion from above and below in an opening in the foot board, and the non-traveling nut is provided with a kerf 17 in its upper edge for the reception of a screw driver by means of which the bolt or screw 13 may be raised or lowered for the purpose of vertically adjusting the detent with relation to the pawl 5 on the stem.

For releasing the pawl 5 by moving the detent from the path of the pawl, a laterally swinging foot lever 18 above the foot board is pivoted at 19 in the bracket 20 fixed to the floor or board and projects down through an opening in the board. The lever is in position for ready access by the foot of the driver of the car, and is located a suitable distance from the button 1 for convenience and safety in the manipulation of the parts.

At its lower end the foot lever has pivoted thereto a connecting bar 21 which is also pivotally connected to the link. By a lateral foot movement the lever 18 is swung to the left to the dotted line position, against the tension of the spring 22 which is anchored to an eye bolt or screw eye 23 and connected to the lower arm of the lever beneath the foot board. As the lever swings on its pivot the link and the detent carried thereby are swung to dotted position to withdraw the detent from the path of movement of the pawl on the stem.

It will be understood that the engine or motor is at all times under control of the foot operated pressure on the button, regardless of the position of the throttle stem. In Figure 3 by full lines, the button is depressed with the throttle in slightly open position, while in dotted lines the button is shown in the position occurring when the throttle is closed.

With the stem in the dotted line position, if it is desired to start the car, foot pressure on the button will depress the stem and move the pawl freely past the detent which latter swings on its pivot out of the path of the pawl, and thereafter the stem may be further depressed to increase the gas supply and accelerate the motor as usual, above a predetermined speed governed by the position of the pawl 4 on the stem. If the foot pressure on the button is released under these conditions, the return to dotted line position of the button in Figure 3 is prevented by the detent which obstructs the movement of the pawl. Under these conditions it will be apparent that the gas supply may be throttled down, by the action of the pawl and detent, to a predetermined point under which the automobile will run on a light load. This minimum supply may be increased for heavier loads by re-adjusting the pawl on the stem.

If the car is running down hill and the driver desires to coast and thus economize in the use of gas, he may apply foot pressure laterally against the lever 18 for the purpose of removing the detent to release the pawl and permit the throttle to close, thus shutting off the supply of gas to the engine or motor.

Having thus fully described our invention, what we claim as new and desire to secure by Letters Patent is—

1. The combination with a reciprocable member of an actuating gas-control device, of a pivoted spring pressed detent and a suspending link therefor, a pawl on the reciprocable member, and means for moving said detent out of the path of movement of the pawl.

2. The combination with the reciprocable member of an actuating device for control of a gas supply having a pawl fixed thereon, of means in the path of movement of said pawl for arresting the reciprocable member to supply a predetermined quantity of gas.

3. In a gas control device the combination with a reciprocable stem having an adjustable pawl fixed thereon, of a spring pressed detent in the path of movement of said pawl, means for adjusting the position of the detent, and means for moving said detent from the path of the pawl.

4. The combination with a reciprocable stem having an adjustable pawl thereon, of a spring pressed detent in the path of movement of said pawl, a supporting link for the detent, an adjustable bolt for the link, and means for swinging said link to remove the detent from the path of the pawl.

5. The combination with a reciprocable stem and its pawl, of a spring pressed detent, a hinged link, a support, a non-traveling nut and a bolt therein for supporting the hinged link, and a lever actuated device for swinging the link to remove the detent from the path of movement of the pawl.

In testimony whereof we affix our signatures.

WALTER C. McLAM.
HERBERT ESHELMAN.